United States Patent [19]
Ohara

[11] Patent Number: 5,099,798
[45] Date of Patent: Mar. 31, 1992

[54] WATER-SUPPLY SYSTEM FOR POULTRY

[76] Inventor: Makoto Ohara, 149, Koyama-cho Nishi 3-chome, Tottori-shi, Tottori Pref., Japan, 680

[21] Appl. No.: 666,653

[22] Filed: Mar. 8, 1991

[30] Foreign Application Priority Data

Jan. 28, 1991 [JP] Japan .................................. 3-8591

[51] Int. Cl.⁵ ............................................. A01K 7/00
[52] U.S. Cl. ................................. 119/80; 119/72.5; 119/75
[58] Field of Search .................... 119/80, 78, 79, 75, 119/72.5, 72

[56] References Cited

U.S. PATENT DOCUMENTS

| | | | |
|---|---|---|---|
| 2,571,536 | 10/1951 | Bush | 119/72.5 X |
| 2,775,227 | 12/1956 | Millies | 119/72.5 |
| 3,450,103 | 6/1969 | Davis | 119/80 |
| 3,543,729 | 12/1970 | Davis | 119/80 |
| 3,610,206 | 10/1971 | Davis | 119/80 X |
| 4,180,015 | 12/1979 | Dawson, Jr. | 119/80 X |
| 4,724,797 | 2/1988 | Steudler, Jr. | 119/72 |
| 4,794,881 | 1/1989 | Rader | 119/72.5 |
| 4,852,522 | 8/1989 | Uri | 119/72 |

*Primary Examiner*—Gene Mancene
*Assistant Examiner*—Thomas Price
*Attorney, Agent, or Firm*—Burns, Doane, Swecker & Mathis

[57] ABSTRACT

Nipples are directly connected to a plurality of locations on the outer periphery of the bottom of a water tank. Each one of the nipples directly flows out and feeds the water in the water tank every time each one of the nipples is opened when the valve stem is pushed thereinto.

21 Claims, 9 Drawing Sheets

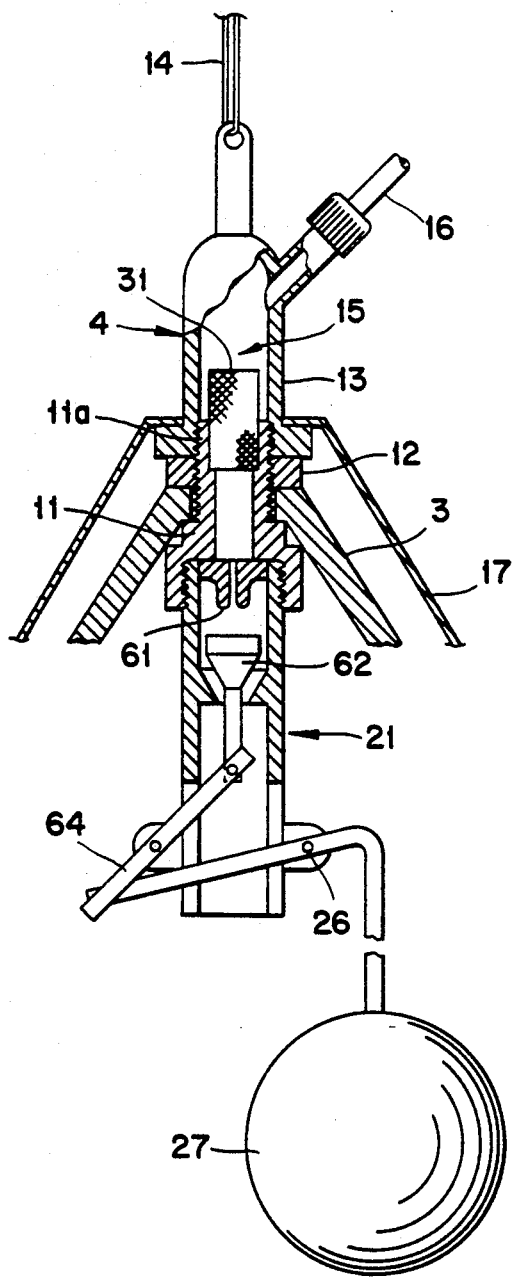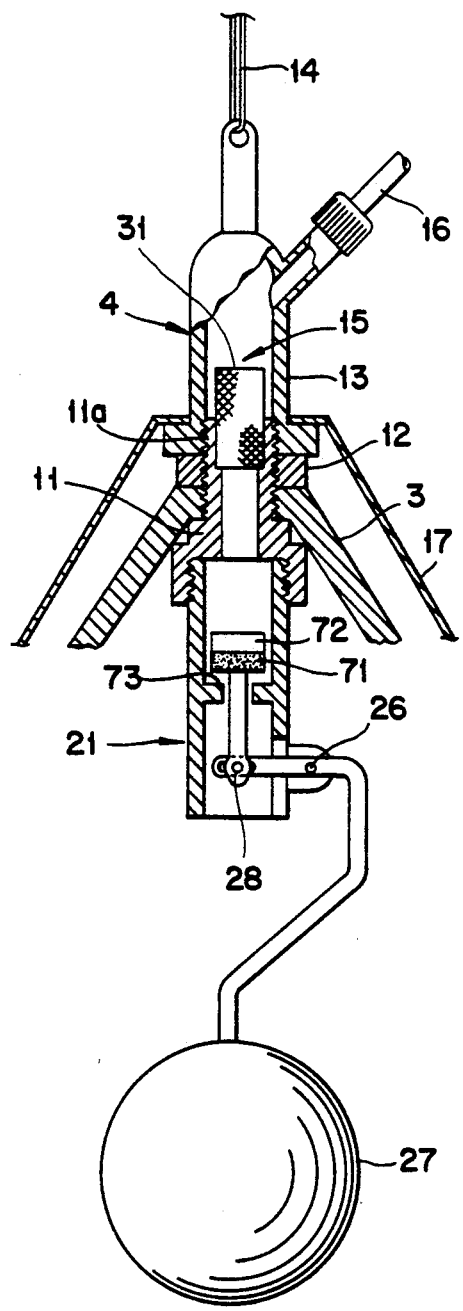

WATER-SUPPLY SYSTEM FOR POULTRY

BACKGROUND OF THE INVENTION

1. Technical Field of the Invention

The present invention relates to a water-supply system which is principally utilized for breeding poultry.

2. Description of Related Art

The water-supply system of this kind has heretofore been used in such a way that water is supplied to an upwardly opened vessel which is made in the shape of a dish or tub to maintain water level at a certain height so that poultry can scoop up water from the vessel with their bills. A fixed type or height adjustable type water-supply system has conventionally been used.

However, water is spattered when they scoop up water with their bills thereby causing the surroundings to become wet and become unsanitary, and the water to be wastefully consumed. Moreover, since dust and rubbish, remains of feed, droppings and the like get into the vessels, the surroundings to be became unsanitary and the vessels can be a source of contagious disease and the like.

In order to cope with such problems, frequent cleanings and the like are required which necessitates much time and labor for maintenance. There is another problem that the water used for the cleaning can not be drained since it causes harm to the public.

The device illustrated in FIGS. 10 and 11 is introduced as a means to solve the problems. In the device, an end of a horizontally arranged conduit pipe B is connected to a decompression tank A, and another end of the conduit pipe B is formed as a ventilation section C which is upwardly bent and opened to maintain the pressure within the conduit pipe B at a predetermined value.

In the longitudinal direction of the conduit pipe B, there are disposed taps D known as nipples at a plurality of locations together with water receiver E. The conduit pipe B is thereby filled with water therein.

When the valve stem of a valve which is provided for the nipple is pecked upwardly with the bill of the poultry, the valve is intermittently opened to flow water in drops intermittently from the tap D so that the poultry can drink the water from the lower position.

With the construction described above, dust and rubbish, remains of feed, droppings and the like do not enter into the water being supplied, and excessive water is prevented from flowing wastefully. Further, water spattering is prevented when poultry drink water as compared with the case when the poultry scoop up the water.

However, said device can not fully satisfy the requirement. For instance, the laid conduit pipe B extends the feeding ground or floor when the system is placed directly on the ground or floor, and it forms a kind of partition to obstruct the movement of the poultry. It further makes it difficult to cross the inside of the poultry farm when maintenance operation is conducted. The whole space required for installing the system thus becomes large, and the taps D are dispersed so widely that it becomes difficult to conduct a maintenance operation.

In the case when the whole structure of the water-supply system is adjustably held in suspension for height regulation, it tends to sag by its own weight unless each part of the system is supported. The support structure thus becomes complicated and expensive. The maintenance operation for the support structure also becomes complicated and the system easily gets out of order.

It provides more chances for the poultry to perch on the conduit pipe B since it obstructs the movement of the poultry. Moreover, since the conduit pipe B can hardly endure such a situation, it is necessary to provide an additional protective member F which is fully provided with the durability to prevent the poultry from perching on the pipe B. The weight of the whole system thus becomes heavy and affects the support structure. This causes the production cost to become expensive. It further causes inconvenience in the handling and maintenance to be.

SUMMARY OF THE INVENTION

A main object of the present invention is to provide a water-supply system for poultry breeding which is capable of solving the above-mentioned problems.

Another object of the present invention is to provide a water-supply system which is utilized for breeding a large number of poultry without taking much space wherein a multiplicity of taps are intensively disposed at one place, the system being sanitary since it is arranged to prevent dust and rubbish, remains of feed, droppings and the like from getting into the system, and further facilitating installation and maintenance.

A further object of the present invention is to provide a water-supply system for poultry breeding which is capable of preventing the poultry from perching on the system and which is advantageous in the aspects of installation, maintenance and sanitation.

A still another object of the present invention is to provide a suspension-type water-supply system capable of achieving water replenishment with a simple construction.

These and other objects and features of the present invention will become more apparent from the following description taken in conjunction with the accompanying drawings which illustrate specific embodiments of the invention.

BRIEF DESCRIPTION OF THE DRAWINGS

FIG. 8 is a cross-sectional view of the structure of a ball tap valve showing a third embodiment of the present invention.

FIG. 9 is a cross-sectional view of the structure of a ball tap valve showing a fourth embodiment of the present invention.

It is to be noted that like parts are designated by like reference numerals throughout the accompanying drawings, and repeated description will be omitted.

DESCRIPTION OF THE PREFERRED EMBODIMENTS

Some of the embodiments of the present invention will now be described below referring to accompanying drawings.

FIGS. 1 through 6 show a poultry water-supply system as a first embodiment to which the present invention is applied.

Figure 1:
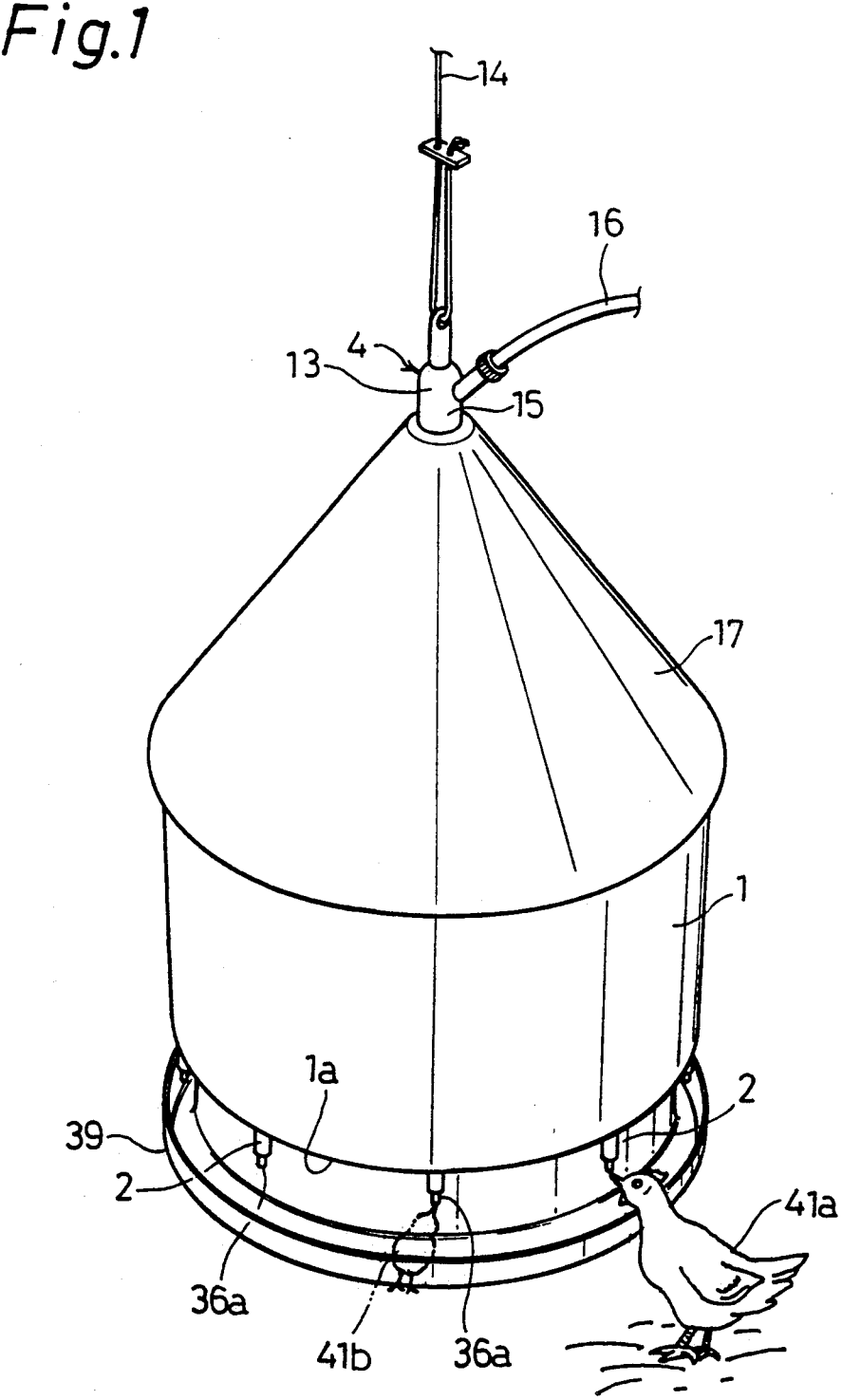
FIG. 1 is a perspective view of a water-supply system for poultry breeding showing a first embodiment of the present invention.
Figure 2:
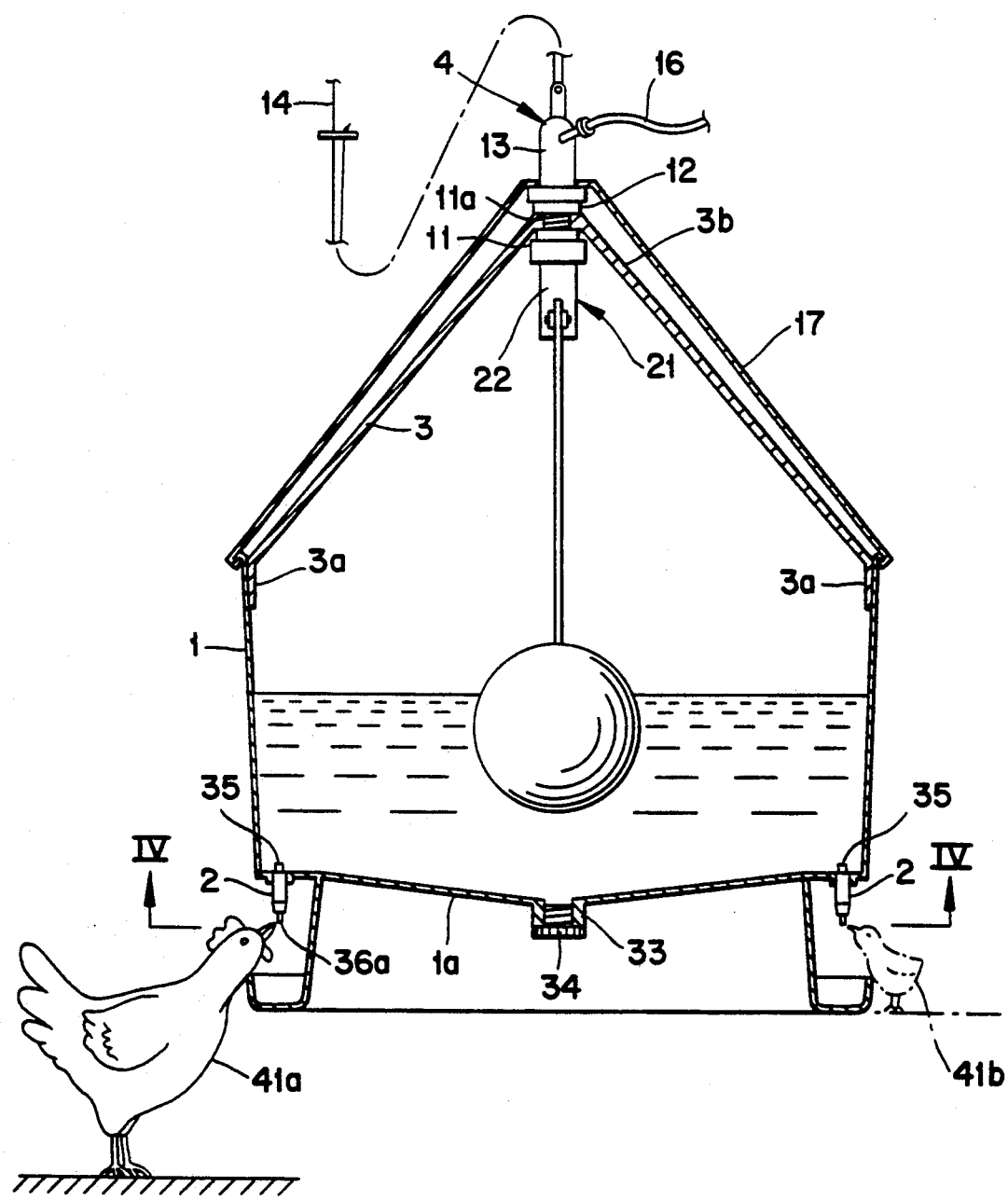
FIG. 2 is a cross-sectional view showing the system in FIG. 1.
Figure 4:
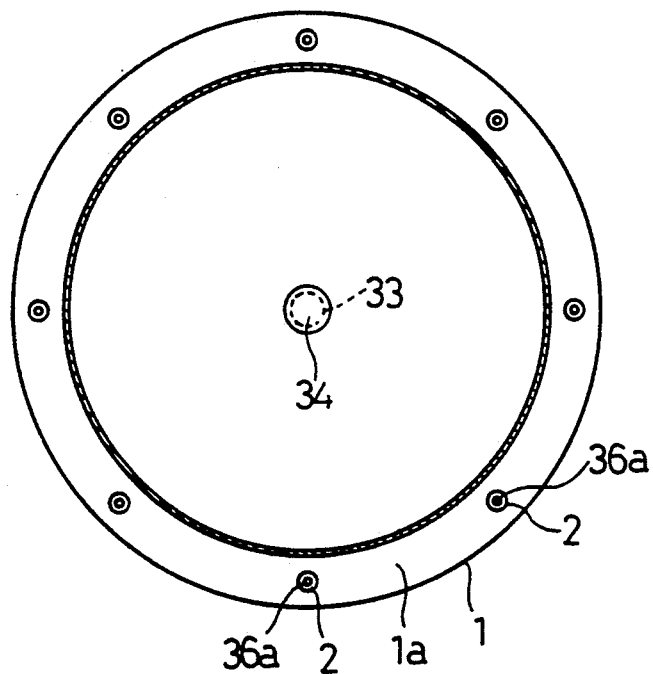
FIG. 4 is a transverse sectional view taken along line IV—IV in FIG. 2.

As illustrated in FIGS. 1, 2 and 4, a multiplicity of taps 2 are disposed directly on the outer periphery of the bottom 1a of a circular water tank 1. In the opening of the water tank 1, both ends 3a of a frame 3 which is angularly bent is attached by means of welding or the like. A suspending member 4 is attached to the central top portion 3b of the frame 3.

Figure 3:
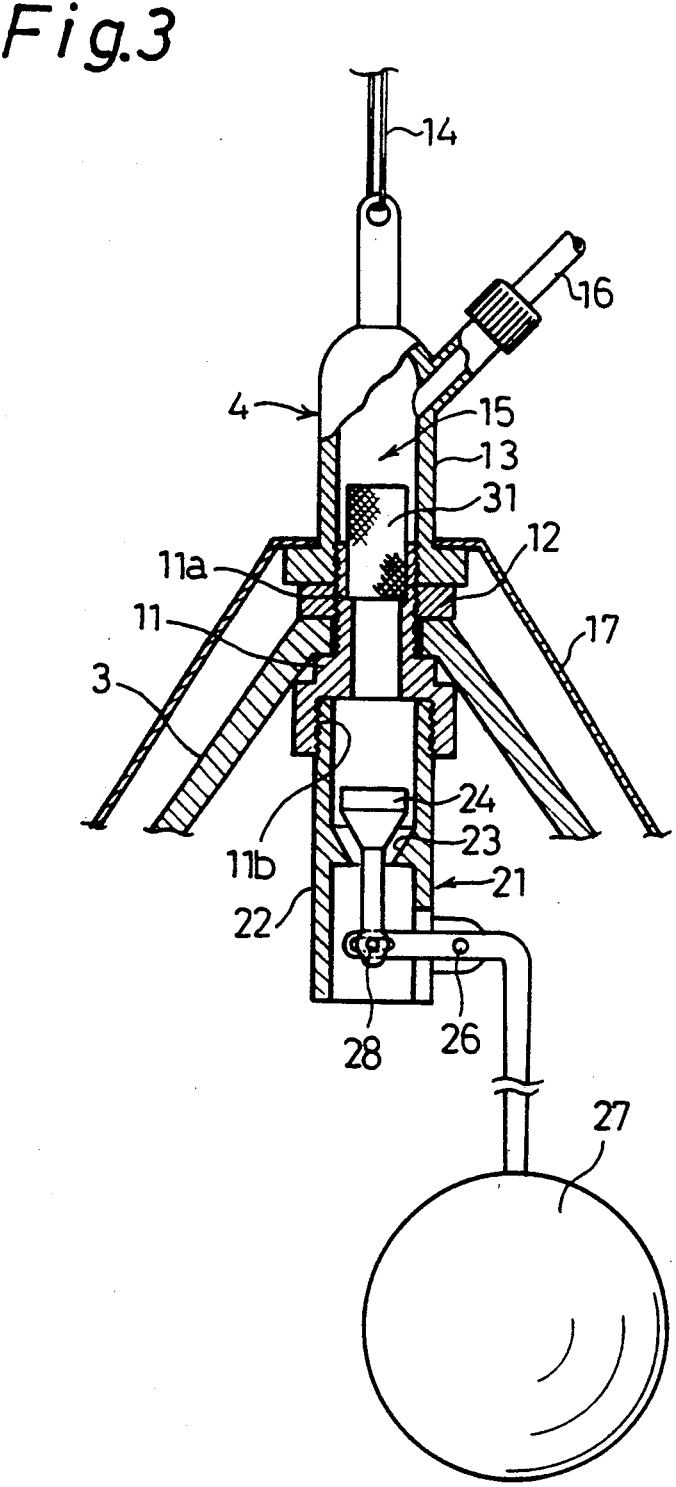
FIG. 3 is a cross-sectional view showing the structure of a ball tap valve for regulating the water level of the system in FIG. 1.

The suspending member 4 is provided with a base metal fitting 11 which is upwardly passed through the frame 3 as shown in FIG. 3. The base metal fitting 11 is provided with a male screw 11a protruding through the frame 3 and fixed to the top of the frame 3 with a nut 12 screwed in the male screw 11a.

The suspending member 4 is further provided into with an upper metal fitting 13 which is screwed the male screw 11a. The upper metal fitting 13 is incorporated with the base metal fitting 11 by clamping together up to the nut 12, and the water tank 1 is suspended by a rope 14 connected to the upper end of the upper metal fitting 13 through the base metal fitting 11 and frame 3.

The rope 14 is wound or unwound by an unillustrated winding mechanism, and the height of the water tank 1 is regulated downward and upwardly through an unillustrated pulley or the like corresponding to the object to be bred, for instance, a fowl 41a or a chicken 41b.

A conical cover 17 which is fitted on the opening of the water tank 1 is attached to the upper metal fitting 13 by welding or the like, and is removed from the water tank 1 by unscrewing the male screw 11a of the base metal fitting 11 whereby the cleaning of the inside of the water tank or the like is facilitated.

The base metal fitting 11 and upper metal fitting are hollow, and a water supply channel 15 which is formed therein is connected with an unillustrated water supply source such as waterworks by a hose 16 or a similar conduit pipe.

At the lower end of the base metal fitting 11, there is provided a ball tap valve mechanism 21 for restricting the supply of water passed through the water supply channel 15 so that the water level in the water tank 1 is maintained at a predetermined level. The ball tap valve mechanism 21 is provided with a main conduit pipe 22 leading to the water supply channel 15, and the mechanism 21 is connected with the base metal fitting 11 when it is screwed in the female screw 11b at the lower end of the base metal fitting 11.

In the main conduit pipe 22, there are provided a valve seat 23 and valve element 24 for opening and closing the water supply channel 15. The valve element 24 is connected by a pin 28 with a ball tap 27 which is pivotally attached by a shaft 26 to the lower outer periphery of the main conduit 22.

The ball tap 27 is moved downward and upwardly corresponding to the water level in the water tank 1. When the water level is lower than a predetermined water level, the valve element 24 is floated from the valve seat 23 to open the water supply channel 15, and the channel 15 is closed when the water level has reached a predetermined level by pushing the valve element 24 to the valve seat 23. With such an operation of the ball tap valve mechanism 21, the water level in the water tank 1 is maintained always at a predetermined level.

At the upper end section of the base metal fitting 11 which is positioned midway in the water supply channel 15, a filter 31 is provided to prevent foreign substances from getting into the water stored in the water tank 1. Various kinds of filters already known may be selectively utilized corresponding to the foreign substance to be removed.

The bottom 1a of the water tank 1 is gently funnelled slanting downward toward the center as clearly illustrated in FIG. 2, and a drain outlet 33 is provided at the center which is the lowest position. The water in the water tank 1 can thus be easily drained completely and it is advantageous to the cleaning operation and the like. Normally, the drain outlet 33 is closed by a tap 34 which is screwed thereinto.

Figure 5:
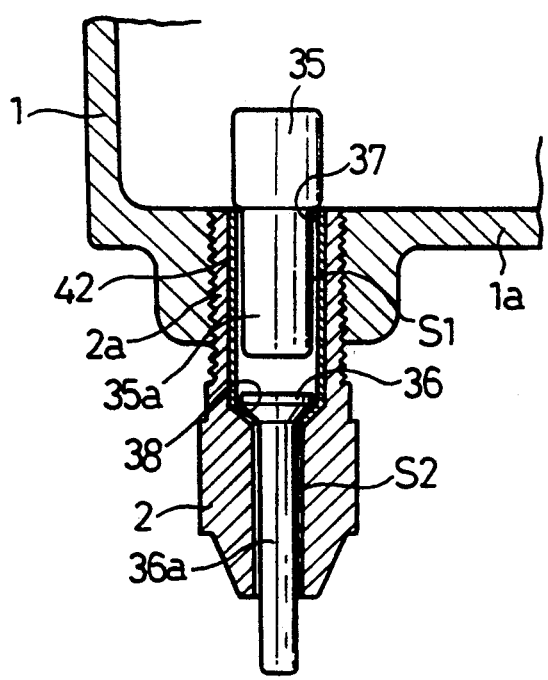
FIG. 5 is an expanded sectional view showing how a tap of the system in FIG. 1 is closed.
Figure 6:
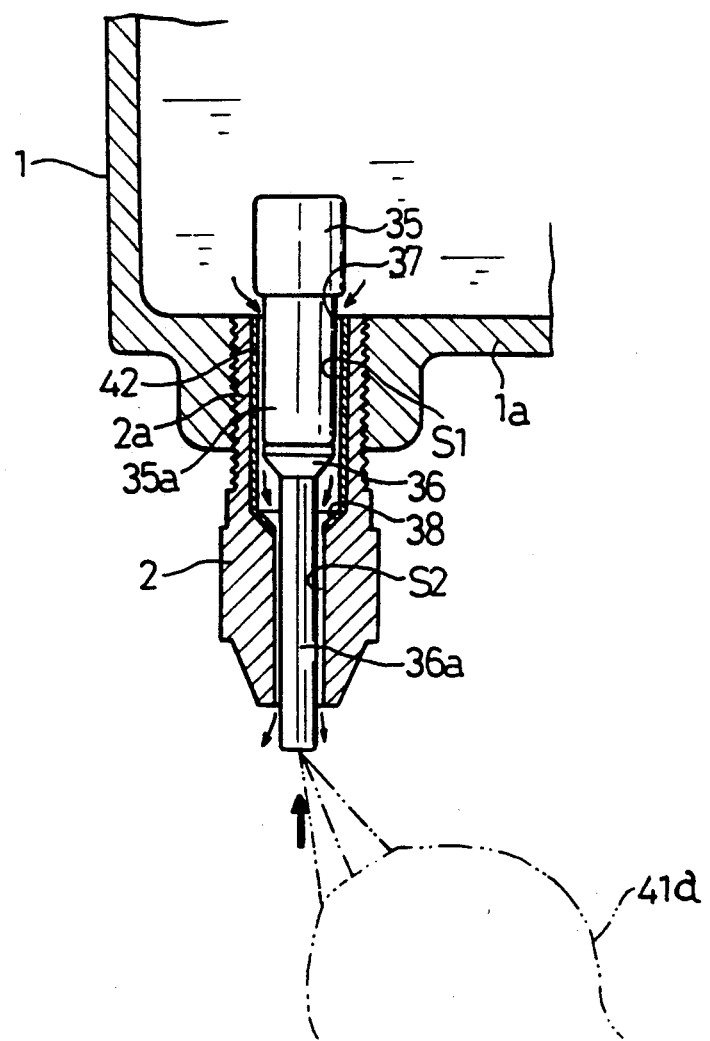
FIG. 6 is an expanded sectional view showing how the tap of the system in FIG. 1 is opened.

The tap 2 is constituted of a nipple member made of synthetic resin downwardly attached to the bottom 1a of the water tank 1 with the male screw 2a as clearly shown in FIGS. 5 and 6, and two valve elements 35 and 36 are accommodated at the upper and lower positions.

The valve elements 35 and 36 are made of metal such as stainless steel and maintain the closed condition by their own weight. The upper valve element 35 closes an opening 37 at the upper end of the tap 2 and the lower valve element 36 closes the valve seat 38 positioned midway in the tap 2. Both of the valve elements 35 and 36 are provided with valve stems 35a and 36a with little gaps S1 and S2 between the inner circumference of the tap 2.

The water in the water tank 1 is arranged to maintain a water pressure corresponding to a predetermined water level. The water is prevented from flowing out of the tap 2 since the valve elements 35 and 36 close the tap 2 at the upper and lower portions as illustrated in FIG. 2. At this time, the valve stem 36a of the valve element 36 which is normally closed is protruded downward.

A fowl 41a and the like to be bred intermittently push up the valve stem 36a protruded downward from the tap 2 every time they want to drink water. At this time, the lower valve element 36 is intermittently pushed upwardly to intermittently open the valve seat 38.

The water in the water tank 1 thereby flows downward through the gaps S1 and S2 of the 2 every time the upper end opening 37 of the tap 2 and the valve seat 38 are opened as if the water drops from the tap 2 along the valve stem 36a of the valve element 36.

The flow of the water is regulated by the balance between the coordinating action of closing and opening of the pair of the upper and lower valve elements 35, 36, the gaps S1 and S2 provided in the tap 2 and the predetermined water pressure by the water level in the water tank 1 whenever the regulation is required. When the water is fed to a chicken, for instance, it is preferable to arrange the flow of the water under the dropping condition thereby preventing excessive water flow and wasteful consumption, and the water is not spattered.

A reference numeral 42 in FIGS. 5 and 6 designates a metal tube inserted in the tap 2 which serves to improve the wear and abrasion resistance against the valve elements 35 and 36. The whole body of the tap 2 may be made of metal.

At the bottom 1a of the water tank 1, there is provided a circular receiving tub 39 positioned under each one of the tap 2. The tub 39 receives the water which inevitably drops from the tap 2 when the poultry drink water, and impounds the water therein to prevent the ground and floor from being wet thereby maintaining the surroundings sanitary.

The receiving tub 39 is attached to the bottom 1a of the water tank 1 by means of welding or the like, and it may also be utilized as a foothold when the water tank 1 is placed on the ground or floor directly for a chicken 41b corresponding to the stature of the chicken 41b (refer to phantom lines in FIGS. 1 and 2).

In the above-mentioned embodiment, the whole body of the system has been described as being formed of metal plate such as stainless steel, however, the whole body or a special part of the system may be formed by synthetic resin. It may be arranged to close the valve of the tap 2 by energizing a spring or the like under another structural arrangement. The shape of the water tank 1 may be variably changed to oval, square or the like. The shape of the cover 17 may also be changed corresponding to the shape of the water tank 1.

In the present embodiment, since the taps are disposed at the outer peripheral portion of the bottom of the water tank, a multiplicity of the taps can be intensively disposed at one place so that a multiplicity of the poultry can be bred thereat without taking much space, and maintenance operation can be easily performed. Further, since the water tank contains a volume of water which corresponds to the number of taps intensively mounted taps, it provides a large inertia for stabilizing the tank more effectively. With simple installation, it can be conveniently used without any problem.

Moreover, dust, remains of feed, droppings of the poultry and the like can be prevented from being entered into the water with the small cover. Even if the poultry gets on the cover by any chance, the cover can easily endure the weight. It is, therefore, not required to strengthen the cover, and any special member or structure to protect the water tank and the cover can be omitted thereby lowering the cost of production and installation.

According to the present embodiment, since the water tank is made circular in shape, the space required for the number of taps can be minimized, and eventually, it is advantageous to the poultry breeding and system maintenance.

According to the present embodiment, since the cover is made conical in shape, the poultry easily slips from the cover even if they try to get on. It can surely prevent the poultry from getting on the cover and it is advantageous to both of the aspects of durability and sanitation. The maintenance can also be facilitated.

According to the present embodiment, the height of the tap can be adjusted by regulating the height of the water tank to corresponds to the chickens, fowls and the like to be bred with a simple construction and operation.

According to the present embodiment, the water tank is adjustably suspended so that the height regulating structure does not obstruct the breeding and maintenance operation. Since the large inertia of the water tank can satisfy sufficient stability, any additional member or structure is not required. It is, therefore, advantageous to the breeding and maintenance operations, and the cost for installation can be lowered.

According to the present embodiment, the water is replenished through the suspending section of the water tank. It is, therefore, not necessary to specially provide a water replenishing member for replenishing the water. The water replenishing structure can thus be simplified to lower the production cost in this respect.

Figure 7:
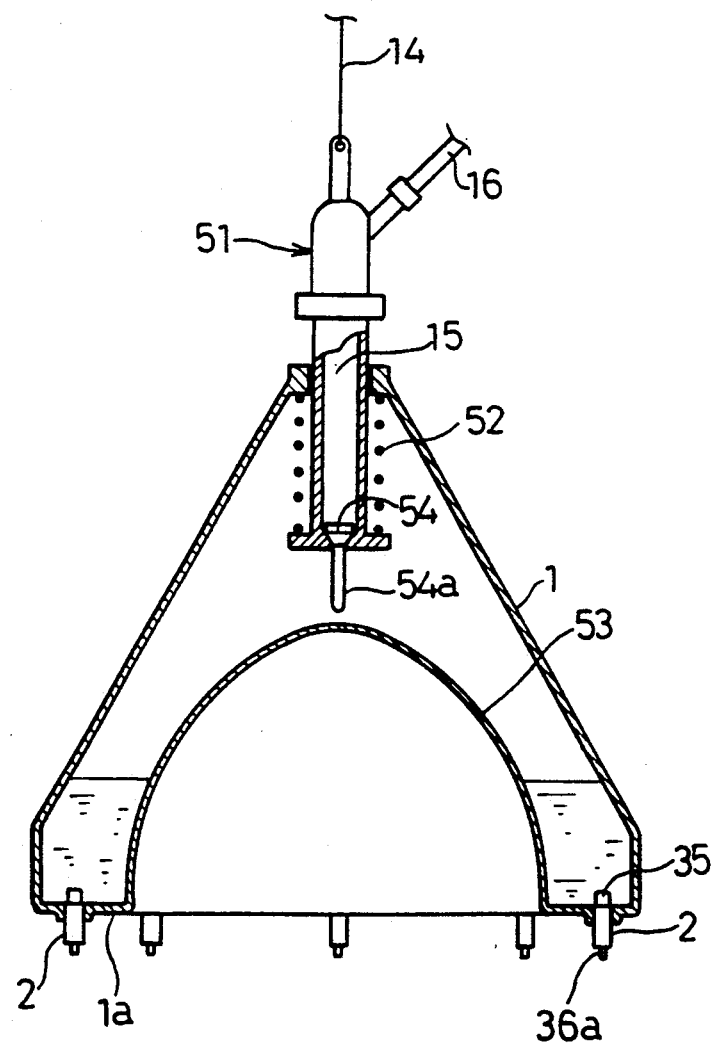
FIG. 7 is a cross-sectional view of a water-supply system for poultry breeding showing a second embodiment of the present invention.
Figure 10:
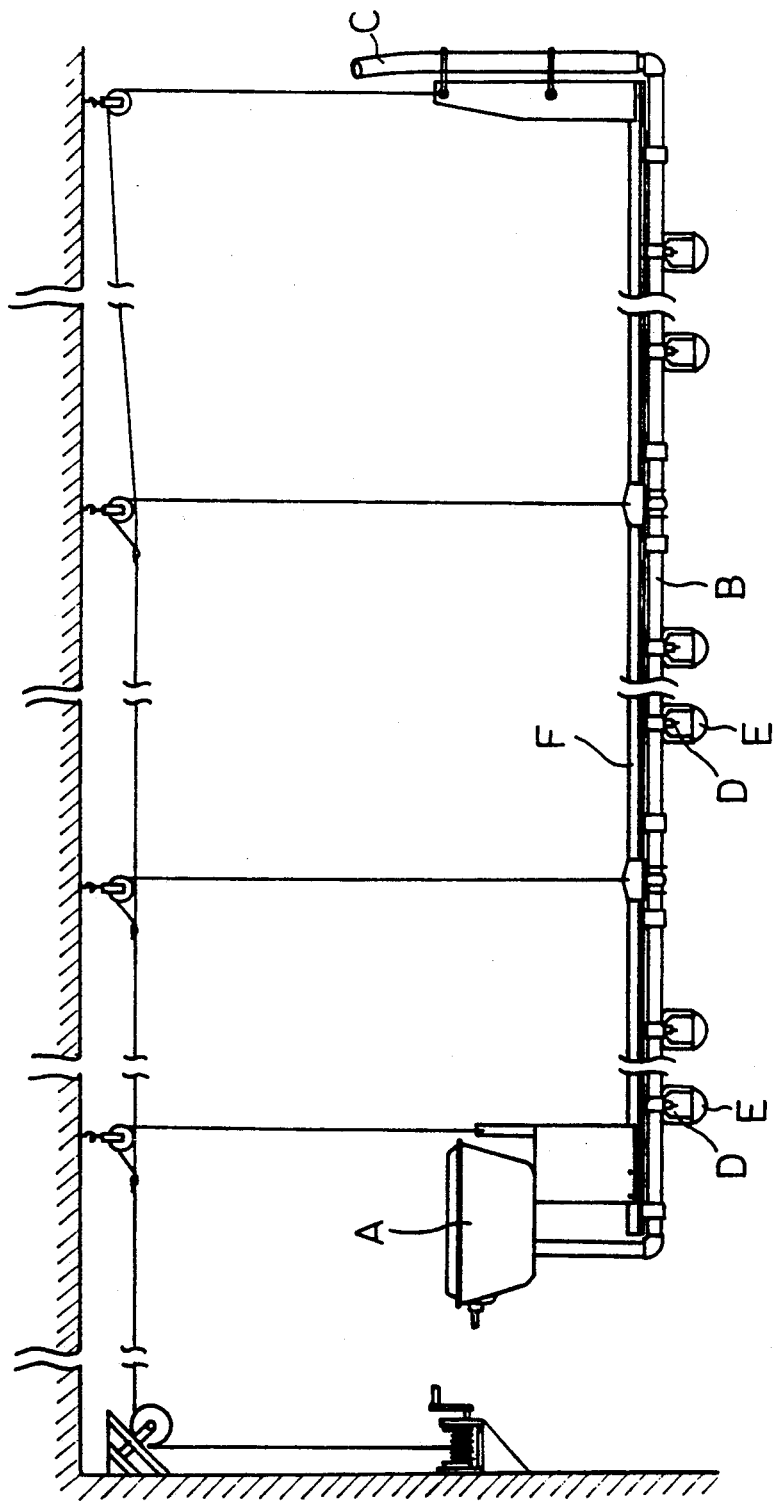
FIG. 10 is a side view showing a conventional water-supply system being used for poultry breeding.
Figure 11:
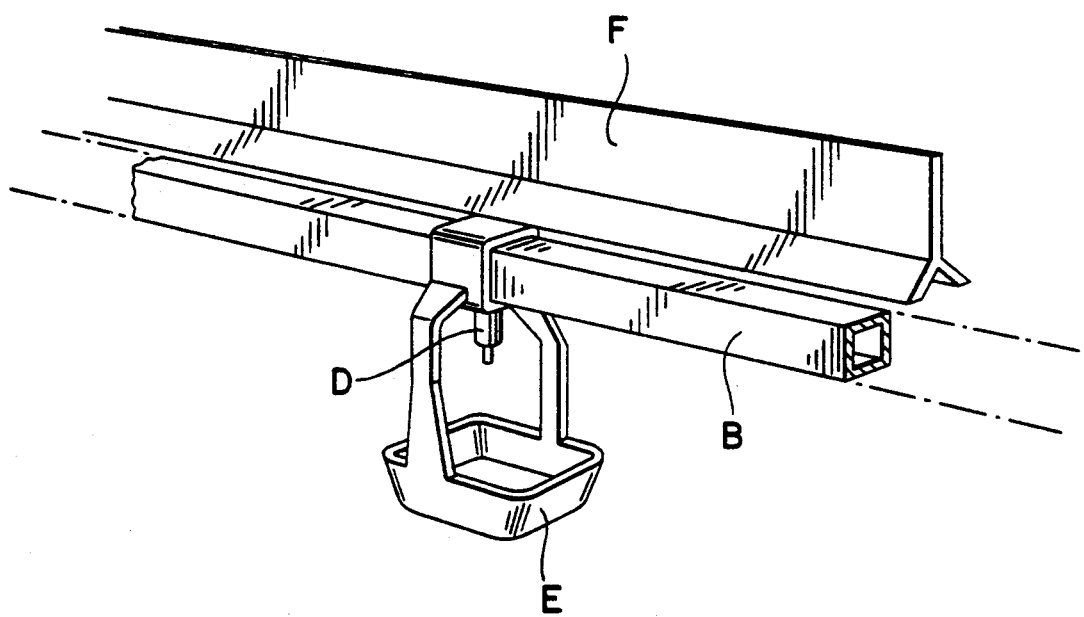
FIG. 11 is a perspective view showing a tap in the conventional system.

FIG. 7 shows a second embodiment of the present invention. In this embodiment, a water tank 1 is movably supported downward and upwardly relative to a suspension member 51, and it is arranged to energize the tank to move upwardly by a spring 52. Accordingly, when the water tank 1 is suspended by the suspension member 51, the water tank 1 is energized through the spring 52 relative to the suspension member 51 and the height is maintained corresponding to a water level.

At the bottom 1a of the water tank 1, there is provided a protrusion 53 upwardly curved at the center, and the protrusion 53 is positioned opposite to a valve stem 54a of a valve 54 provided in a water replenishing channel 15 which is formed in the suspension member 51.

When the water tank 1 is moved upwardly by the spring 52 under the condition that the water level is lower than a predetermined water level, the protrusion 53 pushes up the valve 54 and opens it to let water into the tank 1. When the water tank 1 is moved downward against the spring 52 under the condition that the water level has reached a predetermined water level, the protrusion 53 is moved away from the valve 54 and the valve is closed whereby water replenishing action is stopped. The water level in the water tank 1 is thus maintained always at a predetermined water level as in the case of the first embodiment of the present invention.

FIG. 8 shows a third embodiment of the present invention. In the embodiment, there is provided a valve 62 in a water replenishing channel 15 for closing a valve seat 61 by an upward movement. The valve 62 is connected with a ball tap 27 through a link 64 to reverse the upward and downward movement of the valve 62 relative to the movement of the ball tap 27.

FIG. 9 shows a fourth embodiment of the present invention. In the embodiment, a valve 72 which is provided with a rubber seat 71 is provided for opening and closing a valve seat 73, which is different from the first embodiment of the present invention. By replacing the rubber seat 71, the life of the valve 72 and valve seat 73 can be prolonged.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A fluid-supply system for poultry, comprising:
   a tank for storing fluid, said tank having an opening and a bottom;
   means for closing the opening in the tank;
   a plurality of taps mounted at a plurality of locations on an outer periphery of the bottom of the tank, said taps defining an outlet for the fluid in the tank and each of said taps including a rod;

a valve associated with each of the taps for opening and closing the taps, the valves being normally in a first position for closing the taps and being movable to a second position for opening the taps; and means for replenishing fluid to the tank whenever the fluid level in the tank becomes lower than a predetermined fluid level.

2. The fluid-supply system as defined in claim 1, wherein the shape of the tank is circular on a plane surface.

3. The fluid-supply system as defined in claim 2, wherein the means for closing the opening in the tank is a cover which is conical in shape.

4. The fluid-supply system as defined in claim 1, wherein the means for covering the opening in the tank is a cover, said cover being fitted onto the opening in the tank.

5. The fluid-supply system as defined in claim 1, further comprising a receiving tub attached to the bottom of the tank positioned under the taps for receiving and storing fluid discharged from the taps.

6. The fluid-supply system as defined in claim 5, wherein the shape of the receiving tub is circular.

7. The fluid-supply system as defined in claim 5, wherein the receiving tub serves also as a support leg which rests on the ground or floor when the tank is placed directly on the ground or floor.

8. A fluid-supply system for poultry, comprising:

a tank for storing fluid, said tank having a bottom;

a plurality of taps mounted on an outer periphery of the bottom of the tank, said taps defining an outlet for the fluid in the tank;

a first valve associated with each tap for opening and closing the taps, the first valves being normally in a first position for closing the taps and being movable to a second position for opening the taps;

means associated with each of the first valves for permitting the first valves to be moved from the first position to the second position;

means for permitting fluid to be replenished to the tank whenever the fluid level in the tank becomes lower than a predetermined fluid level;

a suspending member attached to a frame portion of the tank and connectable with a suspension supporting member.

9. The fluid-supply system as defined in claim 8, wherein at least a part of the fluid replenishing means is provided in the suspending member.

10. The fluid-supply system as defined in claim 8, wherein the fluid replenishing means includes a fluid-supply channel in the suspending member.

11. The fluid-supply system as defined in claim 9, further comprising a filter provided midway in the fluid-supply channel for filtering the fluid supplied.

12. The fluid-supply system as defined in claim 10, wherein the fluid replenishing means includes a second valve in the suspending member for opening the fluid-supply channel in dependence upon the fluid level in the tank.

13. The fluid-supply system as defined in claim 12, wherein the second valve is opened and closed by a ball tap which acts in dependence upon the fluid level in the tank.

14. The fluid-supply system as defined in claim 12, wherein the second valve is opened and closed according to variations in the height at which the tank is suspended, the height at which the tank is suspended being dependent upon the fluid level in the tank.

15. The fluid-supply system as defined in claim 12, wherein the tank includes an opening and a cover which covers the opening, the suspending member being provided with a base metal fitting which is attached to the frame and an upper metal fitting which is screwed in the base metal fitting, the base metal fitting being equipped with a third valve and the upper metal fitting being fixed to the cover.

16. The fluid-supply system as defined in claim 15, wherein the shape of the water tank is circular on a plane surface.

17. The fluid-supply system as defined in claim 16, wherein the shape of the cover is conical.

18. The fluid-supply system as defined in claim 17, wherein the cover is fitted on the opening of the tank.

19. The fluid-supply system as defined in claim 15, further comprising a receiving tub attached to the bottom of the tank to be positioned under the taps for receiving and storing the fluid dropped from the taps.

20. The fluid-supply system as defined in claim 19, wherein the shape of the receiving tub is circular.

21. The fluid-supply system as defined in claim 19, wherein the receiving tub serves also as a support leg which rests on the ground or floor when the tank is placed directly on the ground or floor.

* * * * *